United States Patent
McGarry et al.

(10) Patent No.: US 8,619,315 B2
(45) Date of Patent: Dec. 31, 2013

(54) TWO-SIDED PRINT DATA HANDLING

(75) Inventors: Colman McGarry, Dundee (GB); Joseph Jennings, Angus (GB)

(73) Assignee: NCR Corporation, Duluth, GA (US)

( * ) Notice: Subject to any disclaimer, the term of this patent is extended or adjusted under 35 U.S.C. 154(b) by 887 days.

(21) Appl. No.: 12/404,521

(22) Filed: Mar. 16, 2009

(65) Prior Publication Data

US 2009/0244584 A1 Oct. 1, 2009

Related U.S. Application Data

(60) Provisional application No. 61/072,166, filed on Mar. 28, 2008.

(51) Int. Cl.
- *G06K 15/00* (2006.01)
- *G03G 15/20* (2006.01)
- *G03G 15/00* (2006.01)

(52) U.S. Cl.
USPC ............ 358/1.18; 399/82; 399/306; 399/309; 399/364; 399/384; 399/385; 347/171; 347/211; 347/221; 358/1.13

(58) Field of Classification Search
USPC .......... 358/1.18, 1.13; 399/384, 385, 82, 306, 399/309, 364; 347/171–223
See application file for complete search history.

(56) References Cited

U.S. PATENT DOCUMENTS

| | | | |
|---|---|---|---|
| 6,029,020 A * | 2/2000 | Blackman et al. | 399/45 |
| 7,738,809 B2 * | 6/2010 | Tao et al. | 399/85 |
| 7,865,105 B2 * | 1/2011 | Abe | 399/82 |
| 2002/0048029 A1 * | 4/2002 | Yamada et al. | 358/1.5 |
| 2003/0113130 A1 * | 6/2003 | Robertson et al. | 399/82 |
| 2003/0142337 A1 * | 7/2003 | Kizaki et al. | 358/1.13 |
| 2005/0047299 A1 * | 3/2005 | Kikuchi et al. | 369/53.2 |
| 2006/0289633 A1 * | 12/2006 | Moreland et al. | 235/381 |
| 2007/0273744 A1 * | 11/2007 | Yamada et al. | 347/204 |
| 2008/0199235 A1 * | 8/2008 | Shoji et al. | 399/364 |

OTHER PUBLICATIONS

CEN Workshop Agreement CWA 14050-3: Extensions fo Financial Services (XFS) interface specification—Relase 3.0—Print 3: Printer Device Class Interface, Nov. 2000.*

* cited by examiner

*Primary Examiner* — Fred Guillermety

(74) *Attorney, Agent, or Firm* — Dana T. Hustins; Michael Chan

(57) ABSTRACT

According to one embodiment, a computer implemented method of printing data is provided, the method comprising identifying whether a single- or a double-sided printer is operatively connected to the computer, identifying whether single- or double sided media is installed in the printer, and selecting a mode of operation for the printer based on whether it is identified as a single- or a double-sided printer and whether single- or double-sided media is identified as being installed therein. Variations are provided.

10 Claims, 7 Drawing Sheets

TWO-SIDED PRINT DATA HANDLING

CROSS REFERENCE TO RELATED APPLICATIONS

This application claims priority to U.S. Provisional Application No. 61/072,166 entitled "Two-Sided Print Data Handling" and filed on Mar. 28, 2008, the contents of which are hereby incorporated by reference herein in their entirety for all purposes.

BACKGROUND

Two-sided printing, such as two-sided direct thermal and/or two-sided thermal transfer printing, comprises the simultaneous or near simultaneous printing and/or imaging of a first (e.g., a front) side and a second, opposite (e.g., a back or rear), side of two-sided print media, such as two-sided direct thermal and/or two-sided thermal transfer print media. Two-sided direct thermal printing of media comprising a document such as a two-sided direct thermal receipt is described in U.S. Pat. Nos. 6,784,906 entitled "Direct Thermal Printer" and 6,759,366 entitled "Dual-Sided Imaging Element", and U.S. patent application Ser. Nos. 11/159,461 entitled "Receipts Having Dual-Sided Thermal Printing", 11/297,706 entitled "Dual-Sided Thermal Printing", 11/675,649 entitled "Two-Sided Thermal Print Switch", 11/757,529 entitled "Two-Sided Thermal Print Command", and 11/757,553 entitled "Two-Sided Thermal Printer Control", the contents of which are hereby incorporated by reference herein in their entirety for all purposes. Variations include combined direct thermal and inkjet printing as described in U.S. patent application No. 11/701,627 entitled "Direct Thermal and Inkjet Dual-Sided Printing", the entire contents of which are also incorporated by reference herein for all purposes.

In two-sided direct thermal printing, a two-sided direct thermal printer is configured to allow concurrent printing on both sides of two-sided direct thermal media moving along a media feed path through the printer. In such printers a thermal print head is disposed on each of two opposite sides of the media for selectively applying heat to one or more thermally sensitive coatings on the respective sides thereof. The coatings change color when heat is applied, by which printing is provided on the respective media sides.

Two-sided thermal transfer printing of media comprising a document such as a voucher or coupon is described in U.S. patent application Ser. Nos. 11/779,732 entitled "Two-Sided Thermal Printer", 11/780,959 entitled "Two-Sided Thermal Transfer Ribbon", 11/834,411 entitled "Two-Sided Thermal Media", and 11/835,013 entitled "Selective Direct Thermal and Thermal Transfer Printing", the contents of which are hereby incorporated by reference herein in their entirety for all purposes. In two-sided thermal transfer printing, a two-sided thermal transfer printer is configured to allow concurrent printing on a first (e.g., a front) side and a second, opposite (e.g., a back or rear), side of two-sided thermal transfer media moving along a media feed path through the printer. In two-sided thermal transfer printers a thermal print head is disposed on each of a first and a second side of thermal transfer media for selectively applying heat to one or more thermal transfer ribbons interposed therebetween. One or more functional coatings (e.g., comprising a dye) from the thermal transfer ribbon(s) is transferred to the media when heat is applied, by which printing is provided on the respective media sides.

SUMMARY

According to a first embodiment, a computer implemented method of printing data is provided, the method comprising: identifying whether a single- or a double-sided printer is operatively connected to the computer; identifying whether single- or double sided media is installed in the printer; and selecting a mode of operation for the printer based on whether it is identified as a single- or a double-sided printer and whether single- or double-sided media is identified as being installed therein.

Variously, identifying whether a single- or a double-sided printer is operatively connected to the computer may comprise reading a predetermined string of a first service provider command, wherein the predetermined string of the first service provider command may comprise an IpszExtra string of a WFS_INF_PTR_CAPABILITIES command.

Likewise, identifying whether single- or double-sided media is installed in the printer may comprise reading a predetermined string of a second service provider command, wherein the predetermined string of the second service provider command may comprise an IpszExtra string of a WFS-_INF_PTR_STATUS command.

Further, selecting a mode of operation for the printer may comprise printing all logical pages associated with a print job on a single side of a single uncut physical page when the printer is identified as a single- or a double-sided printer with single- or double-sided media installed therein. Alternately, selecting a mode of operation for the printer may comprise printing each logical page associated with a print job on a single side of a single physical page for each logical page when the printer is identified as a single- or a double-sided printer with single- or double-sided media installed therein. In addition, selecting a mode of operation for the printer may comprise printing all logical pages associated with a print job on a single side of a single uncut physical page when the printer is identified as a single-sided printer with single- or double-sided media is installed therein or the printer is identified as a double-sided printer with single-sided media installed therein, and printing odd logical pages on a first media side and even logical pages on a second media side, opposite the first media side, of a single uncut physical page when the printer is identified as a double-sided printer and the media is identified as double-sided media.

According to a second embodiment, a computer implemented method of printing a plurality of forms, such as Extensions for Financial Services (XFS) forms, is provided, the method comprising: printing blocks of front field data, such as XFS front field data, on a first media side and blocks of back field data, such as XFS back field data, on a second media side, opposite the first media side.

Variously, the blocks of front and back field data, such as XFS front and back field data, may be printed on a single uncut physical page (e.g., on a respective first and second side of the single uncut physical page), and/or fields not specifying a front or a back field may default to printing on a first media side.

Further, printing blocks of front field data, such as XFS front field data, on a first media side and blocks of back field data, such as XFS back field data, on a second media side, opposite the first media side, may comprise contiguously printing blocks of front field data on a first media side and contiguously printing blocks of back field data on a second media side, opposite the first media side.

Likewise, printing blocks of front field data, such as XFS front field data, on a first media side and blocks of back field data, such as XFS back field data, on a second media side, opposite the first media side, may comprise not printing a subsequent front or back field block until both of the preceding front and back field blocks are printed.

According to a third embodiment, a computer implemented method of printing a plurality of logical data pages is provided, the method comprising: printing even numbered pages on a first media side, and odd numbered pages on a second media side, opposite the first media side, on a single uncut physical page.

According to a fourth embodiment, a computer implemented method of printing a plurality of logical data pages is provided, the method comprising: identifying a midpoint of the plurality of logical data pages; identifying a next logical data page break following the identified midpoint; and printing logical data pages up to and including the identified next logical data page break on a first media side and logical data pages following the identified next logical data page break on a second media side, opposite the first media side.

According to a fifth embodiment, a computer implemented method of printing data is provided, the method comprising: identifying whether a printer comprises a single- or a double-sided printer; identifying whether single- or double sided media is installed in the printer; and selecting a mode of operation for the printer based on whether it is identified as a single- or a double-sided printer and whether single- or double-sided media is identified as being installed therein.

Variations are possible.

DETAILED DESCRIPTION

Figure 1:
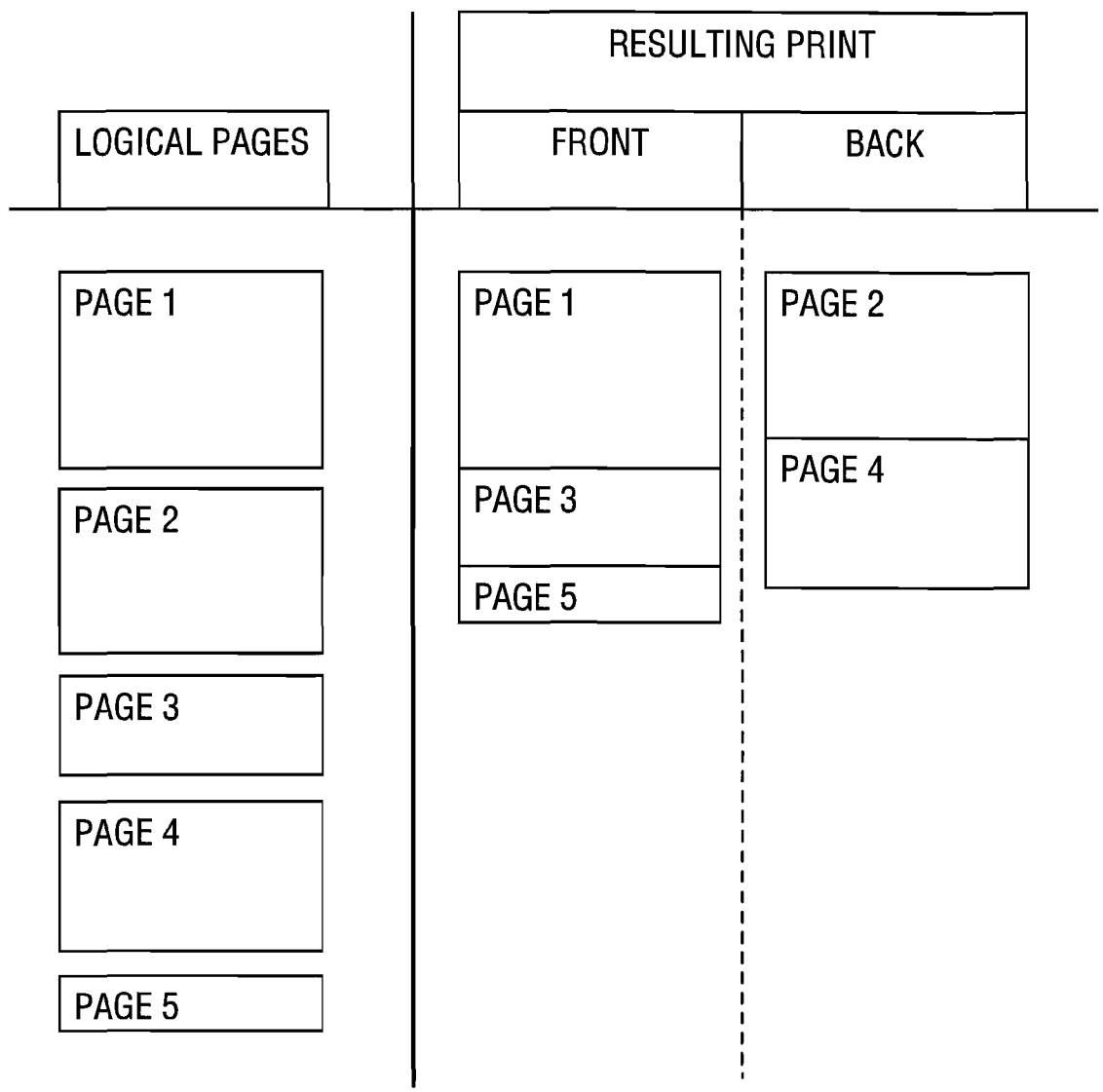
FIG. 1 illustrates a first method of handling data for two-sided printing thereof.

By way of example, various embodiments of the invention are described in the material to follow with reference to the included drawings. Variations may be adopted.

Two-sided printing, such as two-sided direct thermal printing, comprises printers and media permitting simultaneous printing and/or imaging of a front and a back, or rear, side of two-sided media, such as two-sided direct thermal media, in order to, for example, save valuable media resources, employ a dynamic advertising campaign, and the like. For example, two-sided direct thermal printing may be used in retail and/or financial environments for printing of, for example, transaction receipts and/or statements of account whilst using less media and/or for printing of further, desirable information.

In practice, two-sided printing may be used for, inter alia: (i) cheque deposit imaging, permitting, for example, printing of an image of a front side of a utilized or deposited cheque on a first media side and a back side of the utilized or deposited cheque on a second media side; (ii) dynamic advertising/discount offer printing (e.g., coupons) including, for example, customer specific (e.g., customer relationship management, CRM) and/or transaction or activity (e.g., shopping basket, withdrawal, loan inquiry, and the like) based offers; and (iii) paper savings via printing of, for example, a first transaction or statement of account information portion on a first (e.g., a front) media side, and a second transaction or statement of account information portion on a second (e.g., a back) media side, among others.

In providing applications for printing of information such as a transaction receipt or statement of account, a developer may desire to provide for single and/or two-sided printing with a single application for simplicity of programming and to accommodate a variety of installed and/or operated platforms. For example, in the financial field, a particular bank may have a multitude of automated teller machines (ATMs) from a multitude of vendors including a multitude of printer hardware options such as, but not limited to, one- and two-sided direct thermal printers. Further, a type of media installed in an ATMs may vary by accident (e.g., installer error) or on purpose (e.g., for convenience and/or consistency of consumables purchase) such that, for example, a given machine may have one- or two-sided media, such as one- or two-sided direct thermal media, installed therein with or without regard to a type of printer installed.

In support of printing of data by such varied installed base, a given developer may endeavor to have such single application determine which type of printer is installed and/or otherwise available, and what type of media is installed therein or otherwise available thereto in order to determine how to print desired data such as, for example, one or more logical pages representing, for example, transaction information and/or a statement of account. As such, an application may query an associated printer as to whether such printer comprises one- or two-sided print means (e.g., has one or two print heads) and, further, whether one- or two-sided media is installed therein or otherwise available thereto. Such information may, subsequently, be returned to the application through use of, for example, a Service Provider.

For example, in the financial field, an XFS Service Provider may be used to expose a printer's two-sided thermal capabilities in two parts:

1. An IpszExtra string of a WFS_INF_PTR_CAPABILITIES command may state whether or not a two-sided thermal printer is installed. The string may, thus, contain 2_SIDED_HARDWARE=TRUE or 2_SIDED_HARDWARE=FALSE.
2. An IpszExtra string of a WFS_INF_PTR_STATUS command may state whether or not two-sided thermal paper is currently loaded onto the printer. The string may, thus, contain 2_SIDED_THERMAL_PAPER=TRUE or 2_SIDED_THERMAL_PAPER=FALSE. This string may also contain details of the paper type that is loaded such as, for example, in the case of a USB statement printer. The string may, thus, contain PAPER_WIDTH=A4, PAPER_WIDTH=LETTER, PAPER_WIDTH=6_INCH, and the like.

It should be noted that Service Provider support for two-sided printing, such as two-sided direct thermal printing, may only be given via a particular interface (e.g., the Extensions for Financial Services, XFS, WFS_CMD_PTR_PRINT-_FORM interface). Further, how forms, such as XFS FORMs, comprising, for example, one or more logical pages, are processed may differ according to the options made available via the Pre-Configured Printing Options as described hereinbelow.

Pre-Configured Printing Options

The following one- and two-sided print options may be made available via platform (e.g., including one or more computer systems) based pre-configuration in support of one-sided and two-sided printing hardware (e.g., one-sided and two-sided direct thermal printers) and media (e.g., one-sided and two-sided direct thermal paper). These options give applications the choice of how printing on installed media may be carried out with respect to identified printer hardware and media types (e.g., one- or two-sided printers with one- or two-sided media installed therein).

Depending on the embodiment, references to "logical pages" herein may generally refer to each page of data contained in a print job sent via, for example, the Windows® Print Spooler as described in the Microsoft® MSDN library. For example, in the financial arena, a given XFS FORM may be mapped to a separate Win32 logical page. However, where FRONT/BACK field specifiers are used in a given XFS FORM, then 2×Win32 logical pages may be created, one for each of the specified FRONT and BACK field data.

Option 1—One-Sided Thermal Printing: Media Per Print Job Mode (Default)

In one embodiment, one physical page having print on only a single side thereof may be produced for an entire print job. Such one physical page may contain all logical pages regardless of identified printer hardware and/or media configuration, as shown in Table 1.

TABLE 1

| Identified Printer & Media Type/ Print Job | One-sided Hardware | Two-sided Hardware with One-sided Media | Two-sided Hardware with Two-sided Media |
| --- | --- | --- | --- |
| 1 Logical Page Job | Print the 1 logical page on a single (e.g., a thermally sensitive) side of a single (uncut) physical page | Print the 1 logical page on a single (e.g., the thermally sensitive) side of a single (uncut) physical page | Print the 1 logical page on a single (e.g., a front) side of a single (uncut) physical page |
| Multiple (x) Logical Page Job | Print all (x) logical pages on a single (e.g., a thermally sensitive) side of a single (uncut) physical page | Print all (x) logical pages on a single (e.g., the thermally sensitive) side of a single (uncut) physical page | Print all (x) logical pages on a single (e.g., a front) side of a single (uncut) physical page |

Option 2—One-Sided Thermal Printing: Media Per Page Mode

In another embodiment, for any print job, a single physical page having print on only a single side thereof may be produced for each logical page in the print job regardless of the identified printer and/or media configuration, as shown in Table 2.

TABLE 2

| Identified Printer & Media Type/ Print Job | One-sided Hardware | Two-sided Hardware with One-sided Media | Two-sided Hardware with Two-sided Media |
| --- | --- | --- | --- |
| 1 Logical Page Job | Print the 1 logical page on a single (e.g., a thermally sensitive) side of a single (uncut) physical page | Print the 1 logical page on a single (e.g., the thermally sensitive) side of a single (uncut) physical page | Print the 1 logical page on a single (e.g., a front) side of a single (uncut) physical page |
| Multiple (x) Logical Page Job | Print each of x logical pages on a single (e.g., a thermally sensitive) side of a separate (cut) physical page | Print each of x logical pages on a single (e.g., the thermally sensitive) side of a separate (cut) physical page | Print each of x logical pages on a single (e.g., a front) side of a separate (cut) physical page |

Option 3—Two-Sided Thermal Printing: Alternating Page Handling Mode

In a further embodiment, for one-sided hardware (e.g., one-sided direct thermal printers) or two-sided hardware (e.g., two-sided direct thermal printers) with one-sided media (e.g., one sided direct thermal media) installed therein, all logical pages may be printed on a single side of a single, uncut physical page; for two-sided hardware with two-sided media installed therein, alternating logical pages may be printed on front (e.g., pages 1, 3, 5, . . . ) and back (e.g., pages 2, 4, 6, . . . ) sides of a single, uncut physical page, as shown in Table 3.

For example, in one embodiment, as shown in FIG. 1, odd numbered logical pages (e.g., pages 1, 3, & 5) may be contiguously printed on a front side of two-sided media, while even numbered logical pages (e.g., pages 2 & 4) may be contiguously printed on a back side of the two-sided media, opposite the front side. A key concept with this illustrated embodiment is that the current positions of the front and back are tracked separately such that respective odd numbered logical pages follow in close proximity to one another on the front media side and respective even numbered logical pages follow in close proximity to one another on the back media side. Further, even though there are numerous (e.g., 5) logical pages in the job, they are printed on one, uncut, physical page. Variations are, however, possible, including where multiple physical pages are provided comprising one or more logical pages per side each.

TABLE 3

| Identified Printer & Media Type/ Print Job | One-sided Hardware | Two-sided Hardware with One-sided Media | Two-sided Hardware with Two-sided Media |
| --- | --- | --- | --- |
| 1 Logical Page Job | Print the 1 logical page on a single (e.g., a thermally sensitive) side of a single (uncut) physical page | Print the 1 logical page on a single (e.g., the thermally sensitive) side of a single (uncut) physical page | Print the 1 logical page on a single (e.g., a front) side of a single (uncut) physical page |
| Multiple (x) Logical Page Job | Print all (x) logical pages on a single (e.g., a thermally sensitive) side of a single (uncut) physical page | Print all (x) logical pages on a single (e.g., the thermally sensitive) side of a single (uncut) physical page | Print odd logical pages on a front side and even logical pages on a back (opposite) side of a single (uncut) physical page |

For additional two-sided print modes and/or further information on how the above described option may be handled for XFS or Win32 printing, refer to, for example, the Alternate Two-Sided Thermal Printing section hereinbelow.

For example, in some embodiments, each logical page in a print job may be processed according to its page number (e.g., pages 1, 5 and 8 may be printed on a first media side while pages 2, 3, 4, 6 and 7 may be printed on a second media side).

Option 4—Two-Sided Thermal Printing: Mid Point Split

In a further embodiment, logical print data comprising one or more logical pages may be split at or proximate to a mid-point thereof (e.g., the physical, media length-wise, mid-point of all of the logical print data as it would be printed on one-sided media) for printing on one or more media sheets or sides. For example, in one embodiment, a first data half may be printed on a first media sheet or side and a second data half may be printed on a second media sheet or side. Such a Mid Point Split may not be supported where it is undesirable for one or more logical pages, or the data contained therein, to be so split such as, for example, in the case of statement of account and/or graphic entity printing. In such case, any attempt to set a Mid Point Split (i.e., Option 4) may result in an override selection of, for example, Alternating Page Handling Mode (i.e., Option 3) operation.

Alternately, a split of logical data may be permitted at or proximate to a mid point thereof where such split will occur in a suitable clear region such as, for example, between a series of line item entries associated with such data, and/or in one or more clear regions or breaks in associated graphic entity (e.g., bitmap) data, as described in U.S. patent application Ser. No. 11/765,605 entitled "Two-Sided Print Data Splitting" the contents of which are hereby incorporated by reference herein in their entirety for all purposes.

Figure 2:
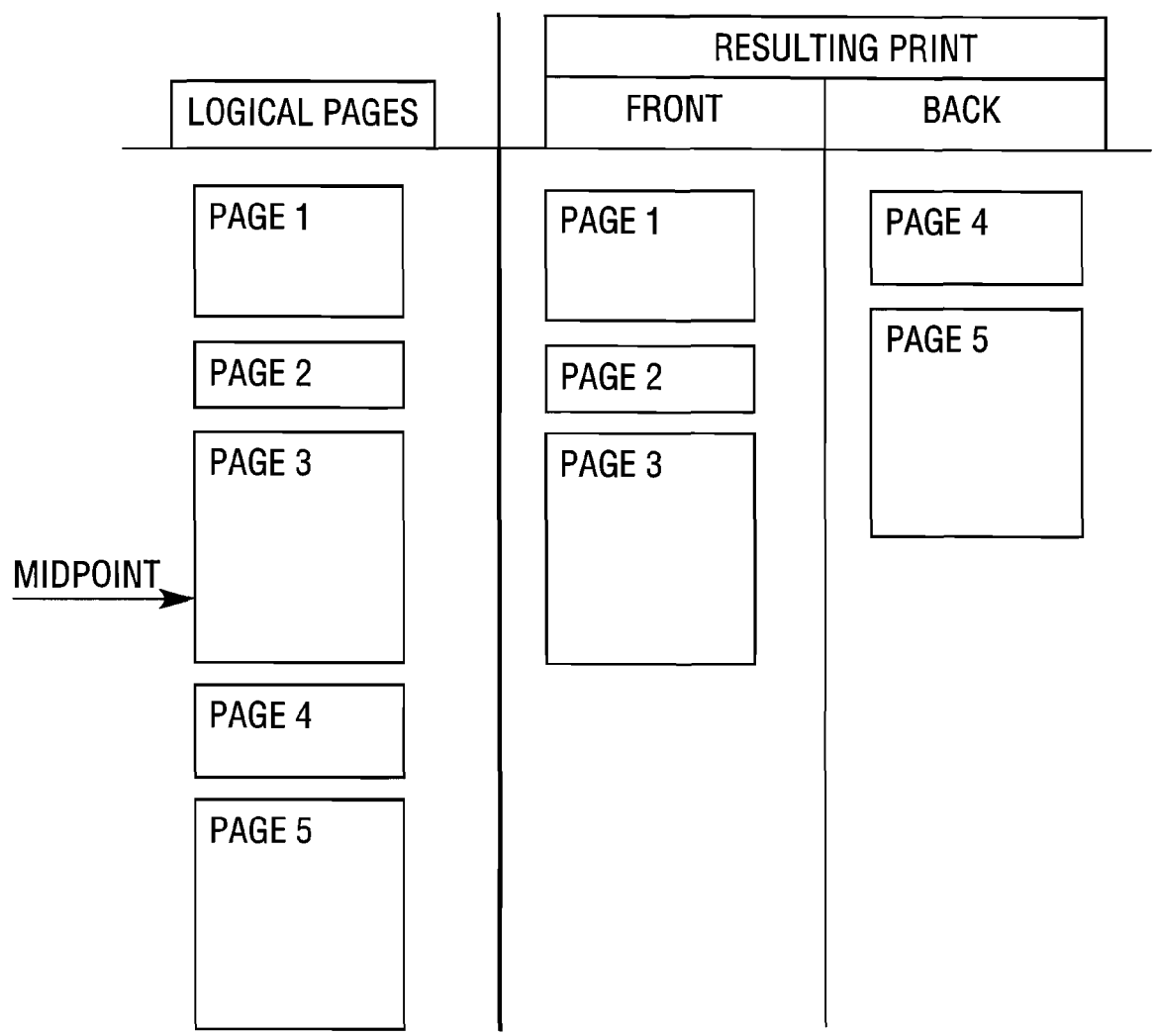
FIG. 2 illustrates a second method of handling data for two-sided printing thereof.

A further variation on Mid Point Split is shown in FIG. 2. As shown in FIG. 2, a print job may typically consist of multiple pages where each page may be of a different length (as shown). In one embodiment (as shown), all pages for the job may be gathered in advance of printing, and a length calculated for each page. The individual page lengths may then be summed to determine a total print stream length. If the printer is identified as a two-sided thermal printer with two-sided thermal paper installed (e.g., 2_SIDED_HARDWARE=TRUE and 2_SIDED_THERMAL_PAPER=TRUE), then the mid point of the total print stream may subsequently be calculated (e.g., via software executed by one or more processors associated with the platform), and a next page boundary beyond the calculated mid point identified (e.g., the end of page 3/boundary between pages 3 & 4 of FIG. 2). Pages up to and including this page boundary (e.g., pages 1, 2 & 3 of FIG. 2) may then be printed on a first (e.g., a front) media side, while pages beyond this page boundary (e.g., pages 4 & 5 of FIG. 2) may then be printed on a second (e.g., a back or rear) media side. Likewise, if the printer is not identified as two-sided, and/or is not identified as being loaded with two-sided paper, then the software may default to print the pages in the order in which they were received on a single media side (e.g., a front side and/or a side comprising one or more thermally sensitive coatings). In this way a user with a mixed base of one- and two-sided printers, and/or variously with one- and/or two-sided media installed, can take advantage of two-sided printing where it is provided for, and single-sided printing where it is not. As such, using this mechanism, a user who currently prints a job as a sequence of pages/forms could move to two-sided printing with little or no application change.

Option 5—Alternate Two-Sided Thermal Printing

Figure 3:
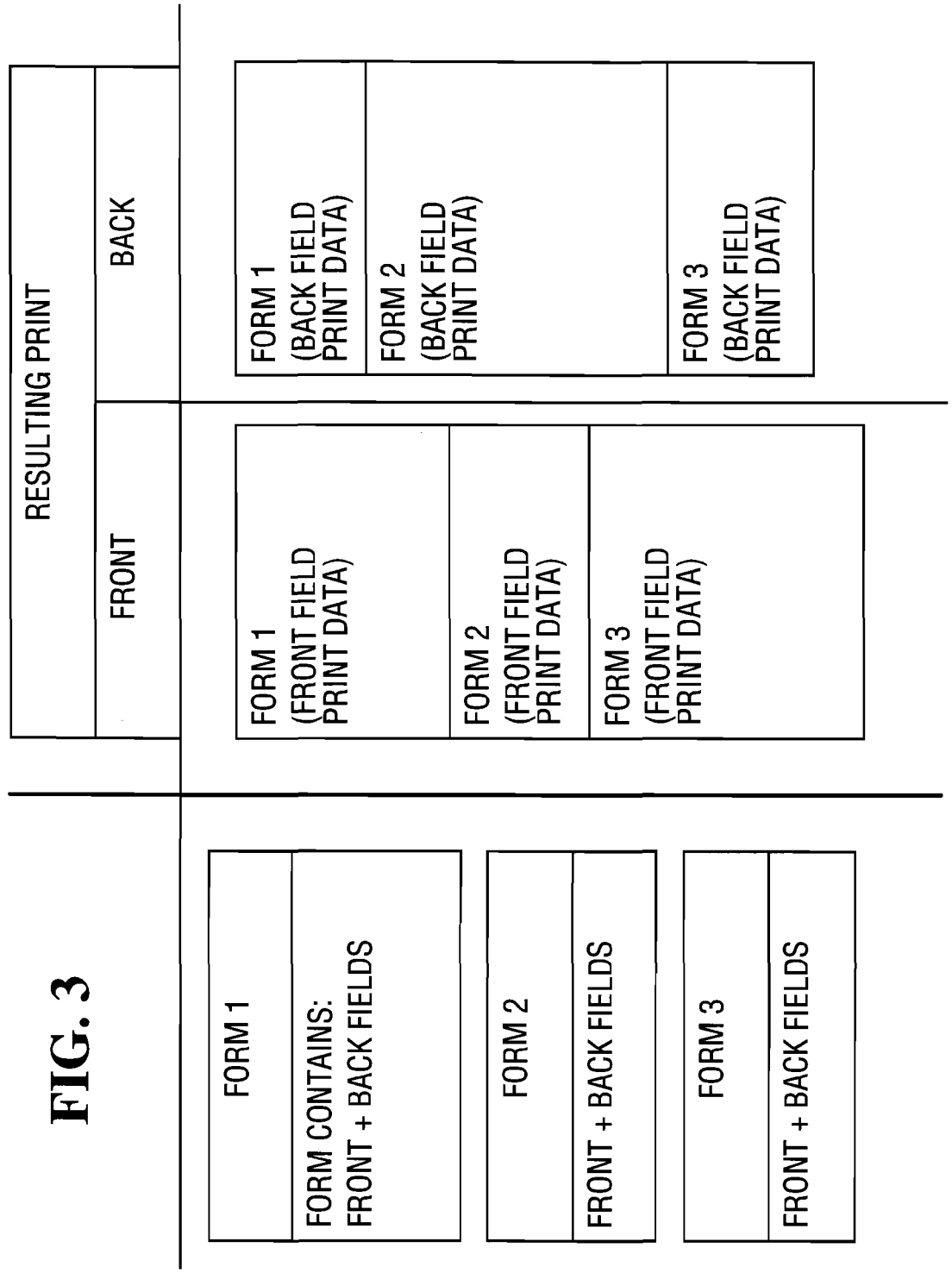
FIG. 3 illustrates a third method of handling data for two-sided printing thereof.

This option uses, for example, "FRONT" and "BACK" side field specifiers for, for example, XFS FORMs selectively print data. Pursuant to this methodology, and as shown in FIG. 3, FRONT fields may be printed on a media front side and BACK fields may be printed on a media back (rear) side. Fields not specifying FRONT or BACK may default to the front side. This option can be used for single or multiple form support.

The key concept with this option (Option 5) is that the current positions of the front/back are tracked separately. As such, sequential FRONT fields are printed proximate to one another on a front media side, while sequential BACK fields are printed proximate to one another on a back media side.

This option (Option 5) gives an application better control over FRONT/BACK selection for printing. As such, the application can better manage sending local/remote data and specifying front and/or back content such as, but not limited to, front and/or back headers and footers, imagery (e.g., cheques/sides thereof), promotions (e.g., coupons, advertisements), and the like.

It should be noted that, depending on the embodiment, a front or back designation may be selected to coincide with a media side visible to a user and/or recipient upon issuance of the media from the printer. As such, information, such as that identified by one or more XFS FORM FRONT or BACK fields, may be selected to be printed on a respective front or back media side so as to be visible to a user and/or recipient upon issuance in order to, for example, enhance awareness of the user and/or recipient of particular information such as, for example, one or more promotions.

Option 6—Alternate Two-Sided Thermal Printing Plus

Figure 4:
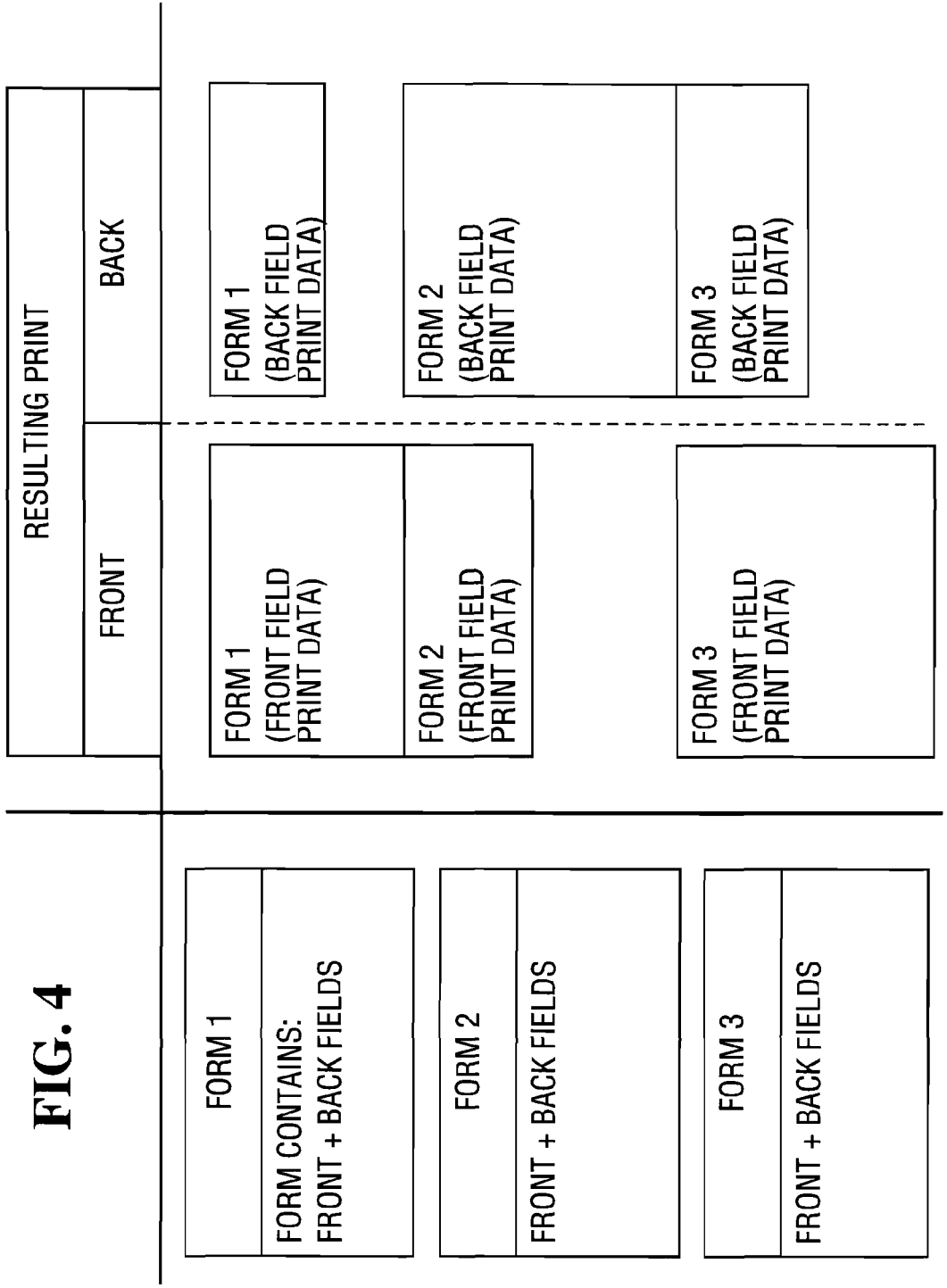
FIG. 4 illustrates a fourth method of handling data for two-sided printing thereof.

In another embodiment, shown in FIG. 4, FRONT and BACK field data association may be maintained such that BACK field data from, for example, a first form is printed on a second media side directly opposite printing of FRONT field data from the first form on the first media side, and the like. In such an embodiment, subsequent FRONT and BACK fields are not printed until both of the preceding FRONT and BACK fields are printed on respective front and back media sides, while alignment of the start and end of associated FRONT and BACK fields is maintained among front and back media sides.

One- and Two-Sided Thermal XFS FORM Printing and Control

In some embodiments for, for example, XFS form printing, where zero is passed as the value to the dwMediaControl parameter for the WFS_CMD_PTR_PRINT_FORM command, this will not cause the form to print, but allow the queuing of form data. However, when any other XFS control command is sent then printing may commence. This methodology allows, for example, applications to split forms into header, body and footer portions, and send each respective portion separately, without any printing being carried out in between.

Likewise, and depending on the embodiment, where, for example, WFS_PTR_CTRLFLUSH (or any other media control command) is passed as the value to the dwMediaControl parameter for either the WFS_CMD_PTR_PRINT_FORM command or the WFS_CMD_PTR_CONTROL_MEDIA command, then printing will commence. In particular, in some embodiments, where a WFS_PTR_CTRLFLUSH is passed as the value to the dwMediaControl parameter for the WFS_CMD_PTR_PRINT_FORM command, then all remaining data that has not yet been printed from a given FORM will be flushed to the printer and printed. Subsequent data for the front and back sides will, as a result, typically be re-synchronised, assuming no other control command is sent between each FORM.

Win32 Two-Sided Support

Printing using the Win32 GDI/Spooler Functions may be processed according to the options made available via the Pre-Configured Printing Options discussed herein. Win32 Duplex printing options are, however, not generally supported.

Top Margin Constraints

Figure 5:
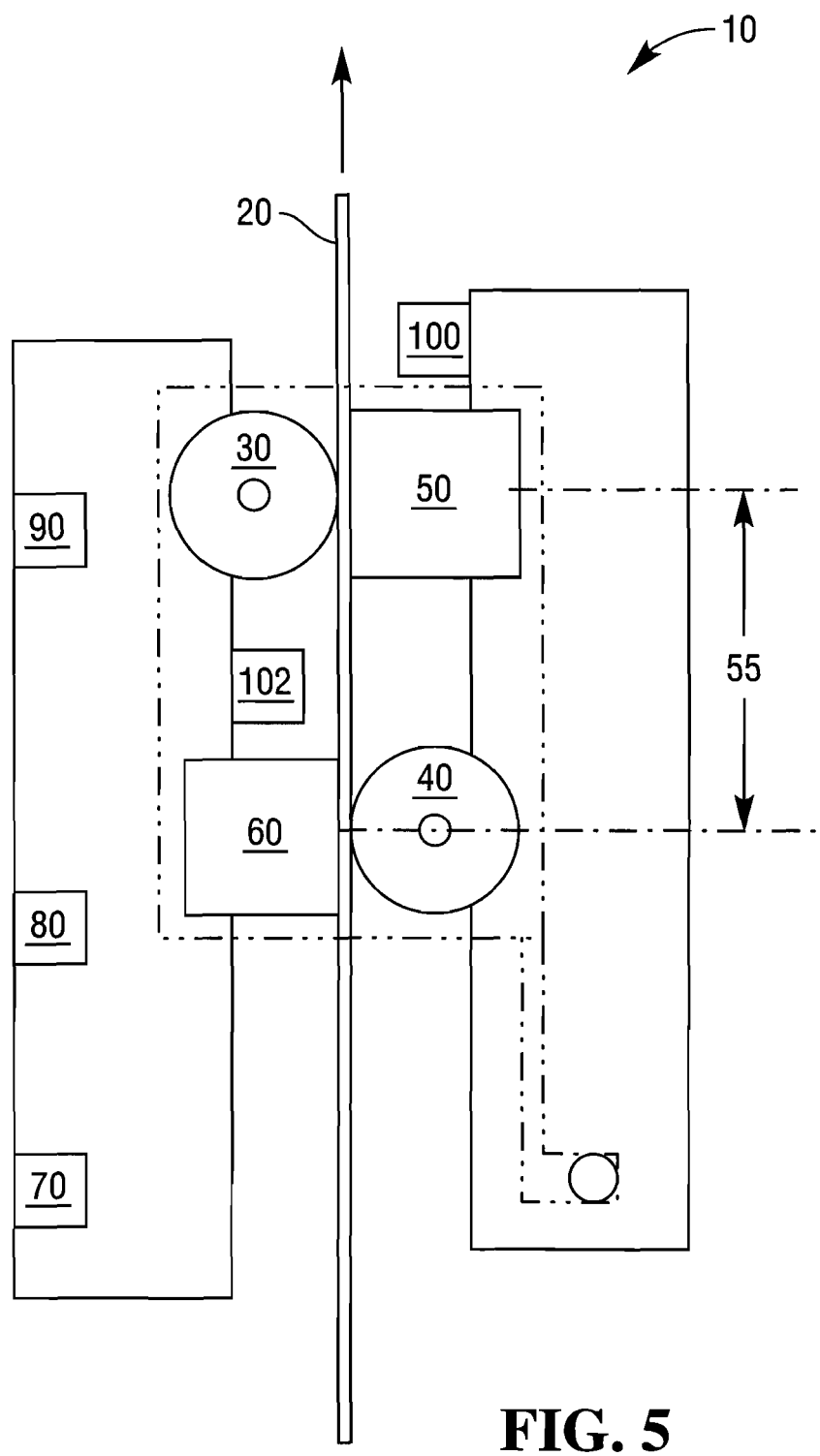
FIG. 5 provides a schematic of a printer.

The top margin of a front and a rear side of a two-sided document printed via a two-sided printer, such as the printer 10 of FIG. 5, may vary. This is due to device hardware design including, inter alia, media feed path wise (e.g., lateral) spacing of a first 50 and a second 60 thermal print head for printing on a first (e.g., front) and a second (e.g., rear) media side, wherein the first and second print heads 50, 60 may not be directly opposite one another on respective media sides, as illustrated with respect to the spacing 55 between the print heads 50, 60 of the printer 10 of FIG. 5.

For example, in one embodiment, a front media side may have a minimum top margin constraint of 10 mm, while a rear media side may have a minimum top margin constraint of 28 mm as a result of an 18 mm lateral space between a first and a second print head for printing on respective first and second media sides.

Notwithstanding the above, it may be desired or required that front and rear top margins be the same (e.g., 4 mm) such as, for example, in the case of a statement printer for printing a statement of account. In such case, consistency of the front and rear top margins may be maintained by, for example, control over the spacing 55 of the first and second print heads 50, 60 and/or control over media location, including retract of media such that a leading edge of the media is proximate to a first (re. up-stream) print head 50 at the start of a print job.

Additional Embodiments

In some embodiments, to fully utilize two-sided thermal printing technology, applications may require modification to maximize performance. In other embodiments, methods where an application can make use of two-sided print technology with little or no application impact are possible. For example, if an application already prints data as a set of pages, or a group of forms through a Service Provider (SP), it may be possible to switch to two-sided thermal printing seamlessly.

Alternate Printer and Media Type Identification

In addition, and/or as an alternative to the methods described above, one or more sensors or detectors may be used to identify whether a single- or double-sided printer is provided, and/or whether single- or double-sided media is installed therein or otherwise available thereto.

For example, FIG. 5 shows a schematic of a printer 10 incorporating one or more sensors 100, 102 to ascertain a type of printer (e.g., single or double sided) and/or media installed therein. Printer 10 may be useable for printing of, for example, transaction receipts, statements of account, and/or tickets at time of issue. The printer 10 operates on installed print media 20 comprising, for example, single- or double-sided direct thermal paper, e.g., comprising a cellulosic or polymeric substrate sheet coated on one or both sides with heat sensitive dyes as described in U.S. Pat. Nos. 6,784,906 and 6,759,366 the contents of which are hereby incorporated by reference herein.

In one embodiment, one or more sensors 100, 102 may be used to ascertain a type of printer 10 (e.g., single- or double-sided, and/or direct thermal, thermal transfer, inkjet, laser jet, and/or dot matrix, and the like) and/or media 20 (e.g., single- or double-sided, and/or direct thermal, thermal transfer, non-thermal, inkjet receptive, laser jet amenable, label, roll, fan-fold, and/or preprinted, and the like) loaded in and/or available to the printer 10, such as that described in, for example, U.S. patent application Ser. Nos. 11/765,605 entitled "Two-Sided Print Data Splitting" and 11/644,262 entitled "Two-Sided Thermal Print Sensing", the entire contents of which are hereby incorporated by reference herein in their entirety for all purposes. Signals from one or more such sensors may, then, be used to, inter alia, provide notification to an associated (e.g., controlling) computer and/or operator thereof of a type of printer 10 and/or media 20 installed therein or available thereto, and/or enable and/or disable one or more functions of the printer 10 based on the sensed printer 10 and/or media 20 type, including ascertaining how data is to be printed pursuant to, for example, one or more of the Pre-Configured Printing Options disclosed herein.

In one embodiment, illustrated with respect to FIG. 5, one or more sensors, such as one or more sensors 100, 102, may be utilized to sense presence of a first and/or a second print head 50, 60. Depending on the embodiment, a sensor 100, 102 may be a continuity sensor, a motion sensor, a hall effect sensor, an infrared (IR) sensor, an ultraviolet (UV) sensor, a radio frequency (RF) sensor (e.g., RFID reader), a charge coupled device (CCD), and the like. In one embodiment, a sensor 100, 102 comprises a continuity sensor adapted to produce a signal indicative of presence of an open or closed circuit comprising a signal, power, or other electrical connection for first and/or a second print head 50, 60, such as one or more thermal print heads wherein, in one embodiment, a closed circuit may be indicative of a particular print head being installed, and an open circuit may be indicative of a particular print head not being installed. In another embodiment, a radio frequency identification (e.g., RFID) tag may be affixed to or otherwise associated with one or more print heads 50, 60, wherein presence or absence of an expected signal from such RFID tag may be used to indicate presence or absence of one or more print heads, as well as a type (e.g., thermal, inkjet, laser, dot matrix, and the like) of print head or heads installed.

In another embodiment, also illustrated with respect to FIG. 5, one or more sensors, such as one or more sensors 100, 102, may be utilized to sense a type of media 20 installed. Depending on the embodiment, a sensor 100, 102 may be an optical sensor such as, but not limited to, an infrared (IR) sensor, an ultraviolet (UV) sensor, and/or a charge coupled device (CCD), a radio frequency (RF) sensor (e.g., RFID reader), and the like. In one embodiment, a sensor 100, 102 comprises a reflectivity sensor adapted to produce a signal indicative of presence of a thermally sensitive or other coating indicating printing of a particular type may be performed on or in such sensed coating. In another embodiment, a radio frequency identification (e.g., RFID) tag may be affixed to or otherwise associated with print media 20, including one or more rolls and/or cores (not shown) thereof, wherein presence or absence of an expected signal from such RFID tag may be used to indicate a type of print media 20 (e.g., single-sided direct thermal, double-sided direct thermal, inkjet, laser jet, thermal transfer, etc.) installed in and/or otherwise available to the printer 10.

In still another embodiment, one or more sensors 100, 102 may be utilized to indicate presence or absence of one or more marks on installed media 20 indicative of whether the media is single- or double-sided (e.g., is capable of being printed on one or two sides thereof). Such marks may be provided on the as-installed media 20 and/or may be printed or attempted to be printed by one or more print heads 50, 60 of an associated printer 10. Depending on the embodiment, such marks may indicate a type of printing such media is capable of supporting (e.g., direct thermal, thermal transfer, inkjet, laser jet, dot matrix, etc) on one or both sides thereof.

In some embodiments, a printer 10 may automatically (e.g., upon power-on, start-up, opening, closing, modification, media replenishment, etc), and/or via one or more externally received commands (e.g., from one or more associated computers and/or controllers), perform a query to ascertain a type of printer 10 it is and/or a type of media 20 which is installed therein and/or associated therewith. Results of such a query from one or more such printer- and/or media-type sensors 100, 102 may automatically or otherwise be sent to an associated computer for controlling printing therewith. Likewise, in some embodiments results of such a query may be stored in a memory or buffer 80 of the printer 10 for later query by an associated terminal (e.g., computer) and/or other device. Alternately, in some embodiments, results of such a query may be used to enable and/or disable one or more modes of operation within the printer such as, but not limited to, setting a printer for single sided direct thermal printing where, for example, single sided direct thermal media is detected in a printer comprising one or more direct thermal print heads.

In still other embodiments, in lieu of one or more sensors 100, 102, one or more jumpers or dip switches (not shown) may be set to provide an indication of number and/or type of print heads 50, 60 installed in a printer 10, and/or a binary or other sequence similarly representative may be provide in a memory or buffer 80 of the printer 10. Likewise, a signal from one or more sensors 100, 102 may be used to provide an operator notification and/or automatically enable and/or disable one or more printer functions, such as one or more dual-sided print functions alone, or in concert with a signal indicative of a type of media installed.

The above description is illustrative, and not restrictive. In particular, a type of printing to which such data handling and print methods are applicable may vary and include, inter alia, direct thermal, thermal transfer, inkjet, laser, and dot matrix. Likewise, any or all of such printing types, including associated printers and media, and above disclosed data handling and print methods, may be used in or with a variety of platforms or environments including, but not limited to, retail (e.g., POS, self-checkout, etc), financial (e.g., ATM, statement kiosks, etc), travel (e.g., airport and/or hotel self check-in kiosks, car rental kiosks, etc), hospitality (e.g., restaurant), and the like.

Figure 6:
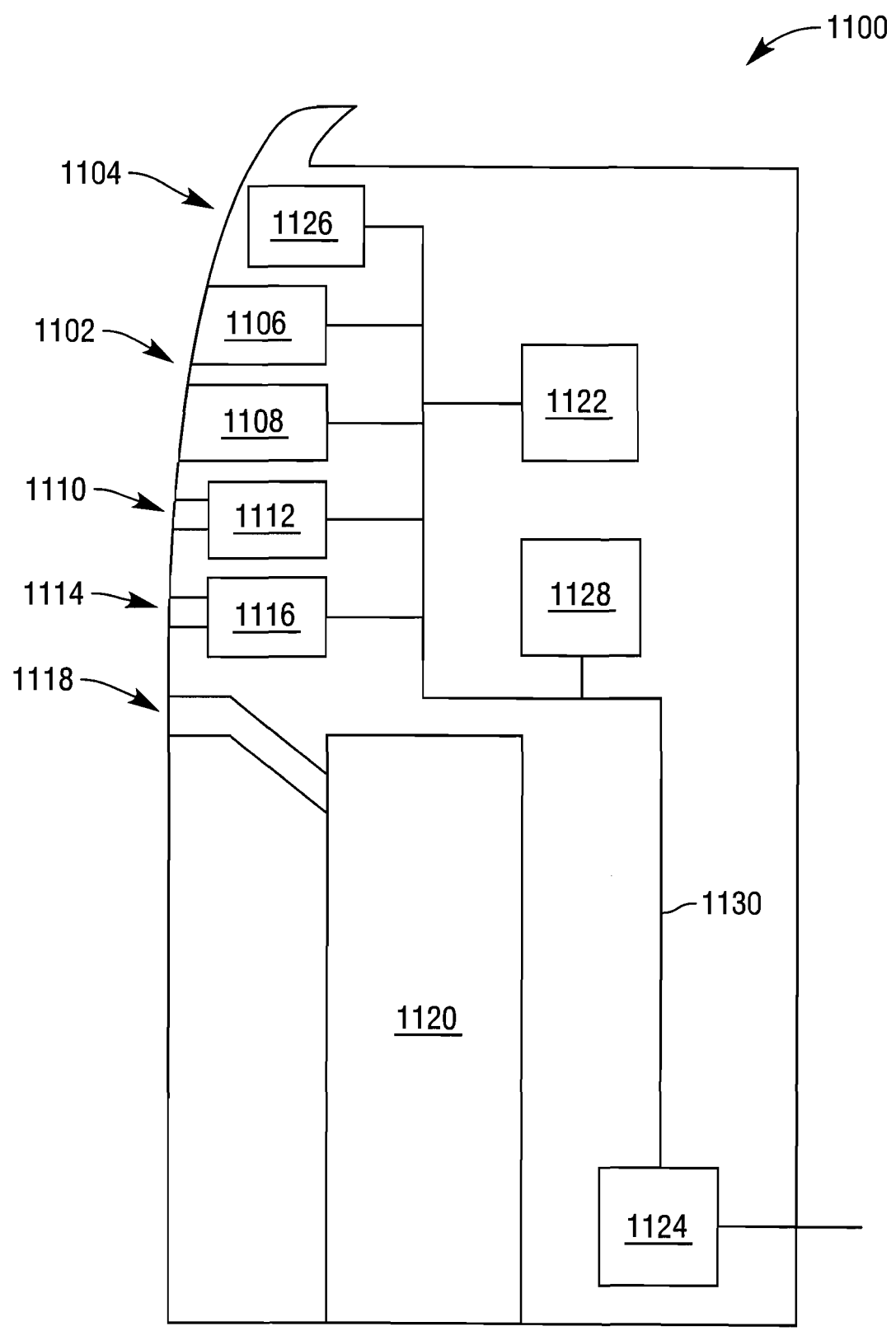
FIG. 6 provides a schematic of a self-service terminal in the form of an automated teller machine (ATM).

For example, in some embodiments, the above disclosed data handling and print methods may be used in conjunction with a self-service terminal in the form of an automated teller machine (ATM). As illustrated with respect to FIG. 6, an ATM 1100 may include a user interface 1102 for input of information to, and output of information from, the ATM 1100. The user interface 1102 may comprise a molded fascia 1104 incorporating a touch screen 1106 for input and output of transaction information, an encrypting keypad module 1108 for input of alphanumeric and/or preset function information, and a plurality of input and output slots aligned with modules located behind the fascia 1104. The slots include a card entry/exit slot 1110 that aligns with a magnetic card reader/writer (MCRW) module 1112, a printer slot 1114 that aligns with a printer module 1116, including, for example, a single- or double-sided thermal printer 10, and a cash dispense slot 1118 that aligns with a cash dispense module 1120.

In addition, the ATM 1100 may include an internal journal printer module 1122 for creating a record of all transactions executed by the ATM 1100, and a network communication module 1124 for communicating with other ATMs 1100 and/or a remote host (not shown) and the like. The ATM 1100 may also includes a wireless communication module, in the form of a cellular, WiFi (trademark), and/or Bluetooth (trademark) transceiver 1126, for enabling information pertaining to a wireless transaction to be sent to and received from a wireless electronic device (not shown) associated with, for example, a user of the ATM 1100.

The ATM 1100 may also include a controller (e.g., computer) module 1128 for controlling operation of the various additional modules comprising the ATM 1100, and a bus 1130 for interconnecting all of the modules.

Figure 7:
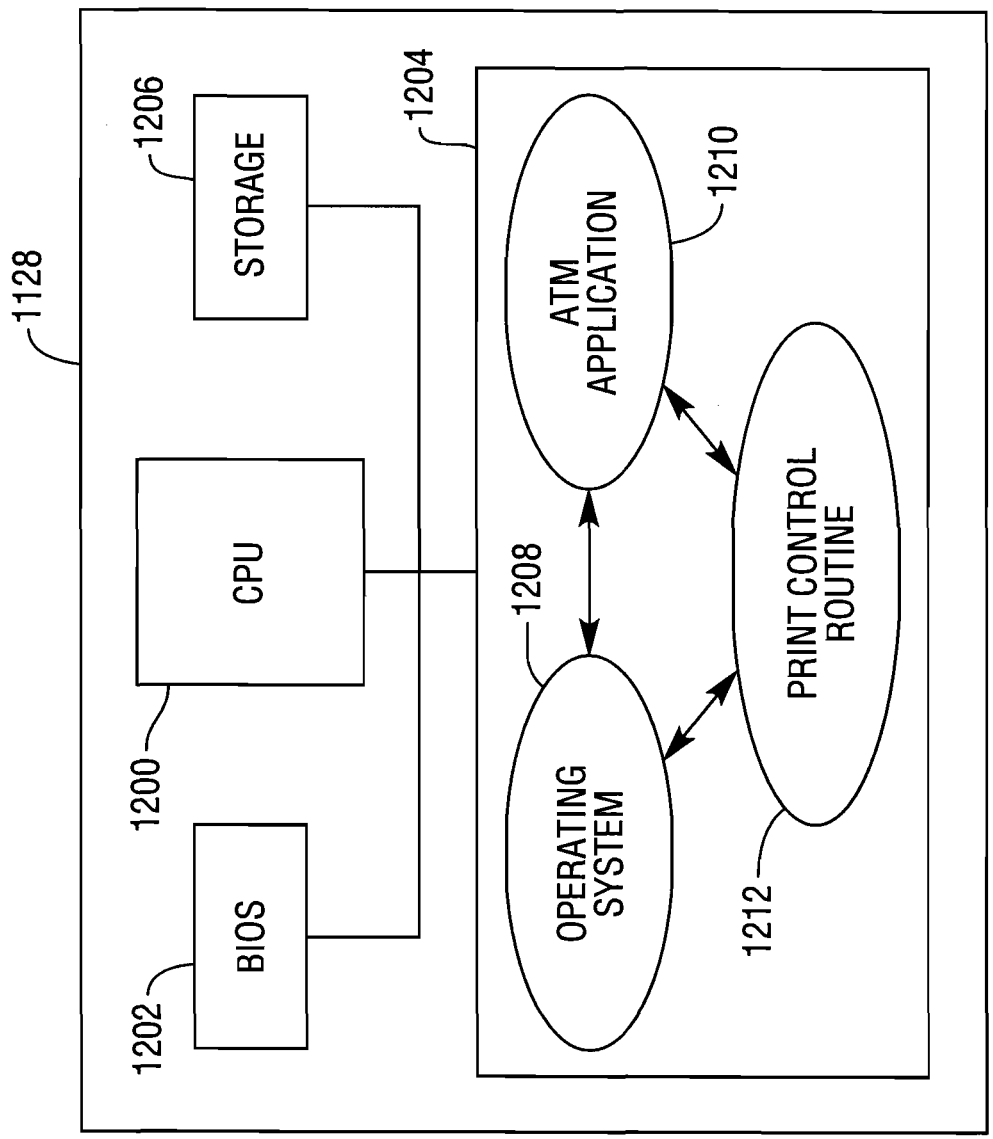
FIG. 7 provides a schematic of a controller (e.g., computer) module for, for example, the ATM of FIG. 6.

The controller module 1128, shown in more detail in FIG. 7, comprises a processor 1200, a basic input output system (BIOS) module 1202, a main (volatile) memory 1204 in the form of RAM, and a persistent storage 1206 in the form a magnetic (hard) disk drive. In operation, the controller module 1128 of the ATM 1100 loads, inter alia, an operating system 1208, an ATM application program 1210, and a print control routine 1212 from the persistent storage 1206 to the main memory 1204 for execution by the processor 1200 in order to, for example, provide self-service banking functions to a user of the ATM 1100, including providing information for printing to and/or controlling a mode of operation of (e.g., single- and/or double-sided printing) one or more associated printers 1116, 1122.

Many additional embodiments will be apparent to those of skill in the art upon reviewing the above description. The scope of the embodiments should therefore be determined with reference to the appended claims, along with the full scope of equivalents to which such claims are entitled.

In the foregoing description of the embodiments, various features are grouped together in a single embodiment for the purpose of streamlining the disclosure. Likewise, various features are described only with respect to a single embodiment in order to avoid undue repetition. This method of disclosure is not to be interpreted as reflecting that the claimed embodiments should have more features than are expressly recited in each claim. Rather, as the claims reflect, inventive subject matter may lie in less than all features of a single disclosed embodiment, and/or may comprise a combination of features from one or more embodiments. Thus the claims are hereby incorporated into the description of the embodiments, with each claim standing on its own as a separate exemplary embodiment.

What is claimed is:

1. A computer implemented method of operating a self-service transaction terminal to print a plurality of XFS forms by a printer of the self-service transaction terminal to provide a self-service terminal user with a dual-sided statement for a self-service transaction conducted by the self-service terminal user at the self-service transaction terminal, the method comprising:
    identifying whether single- or double-sided media is installed in the printer by reading a signal from one or more reflectivity sensors included in the printer, the one or more reflectivity sensors being adapted to produce a signal indicative of the presence of a thermally sensitive coating on a first or second side of the media;
    printing blocks of XFS front field data on a first media side and blocks of XFS back field data on a second media side, opposite the first media side, if the media is identified as double-sided media, wherein (i) the blocks of XFS front and back field data are printed on a single uncut physical page, and (ii) printing blocks of XFS front field data on a first media side and blocks of XFS back field data on a second media side, opposite the first media side, comprises not printing a subsequent front or back field until both of the preceding front and back fields are printed on the single uncut physical page; and
    delivering to the self-service terminal user the single uncut physical page which has the blocks of XFS front and back field data printed thereon to provide the dual-sided statement for the self-service transaction conducted by the self-service terminal user at the self-service transaction terminal.

2. The method of claim 1, wherein fields not specifying a front or a back field default to printing on a first media side of the single uncut physical page.

3. A computer implemented method of operating a transaction terminal to print a plurality of logical data pages by a transaction receipt printer of the transaction terminal to provide a transaction terminal user with a dual-sided transaction receipt for a transaction conducted by the transaction terminal user at the transaction terminal, the method comprising:
    identifying a midpoint of the plurality of logical data pages;
    identifying a next logical data page break following the identified midpoint;

printing logical data pages up to and including the identified next logical data page break on a first side of the dual-sided transaction receipt and logical data pages following the identified next logical data page break on a second side of the dual-sided transaction receipt, opposite the first side of the dual-sided transaction receipt; and delivering to the transaction terminal user the dual-sided transaction receipt.

4. The method of claim 3, wherein the transaction terminal comprises a self-service transaction terminal selected from one of a self-service checkout terminal, an automated teller machine (ATM), a financial statement kiosk, an airport check-in kiosk, a hotel check-in kiosk, and a car rental kiosk.

5. The method of claim 3, wherein the transaction terminal comprises a point-of-sale (POS) transaction terminal.

6. The method of claim 3, wherein the method is performed by a computer having a memory executing one or more programs of instructions which are tangibly embodied in a non-transitory program storage medium readable by the computer.

7. A computer implemented method of operating a transaction terminal to provide a transaction receipt for a transaction conducted by a transaction terminal user at the transaction terminal, the method comprising:

identifying whether a single- or a double-sided transaction receipt printer is installed in the transaction terminal;

identifying whether single- or double-sided media is installed in the transaction receipt printer;

selecting a first mode of operation for the transaction receipt printer in which all logical pages associated with a print job are printed on a single side of the media when (i) the transaction receipt printer is identified as a double-sided transaction receipt printer with single-sided media installed therein, (ii) the transaction receipt printer is identified as a single-sided transaction receipt printer with single-sided media installed therein, or (iii) the transaction receipt printer is identified as a single-sided transaction receipt printer with double-sided media installed therein, and thereby to provide a single-sided transaction receipt to be delivered to the transaction terminal user for the transaction conducted by the transaction terminal user at the transaction terminal;

selecting a second mode of operation for the transaction receipt printer in which odd logical pages are printed on a first side of the media and even logical pages are printed on a second media side which is opposite the first side of the media when the transaction receipt printer is identified as a double-sided transaction receipt printer with double-sided media installed therein and thereby to provide a double-sided transaction receipt to be delivered to the transaction terminal user for the transaction conducted by the transaction terminal user at the transaction terminal;

identifying a midpoint of all of the logical data pages when the second mode of operation for the transaction receipt printer is selected;

identifying a next logical data page break following the identified midpoint when the second mode of operation for the transaction receipt printer is selected;

printing logical data pages up to and including the identified next logical data page break on one side of the transaction receipt and logical data pages following the identified next logical data page break on an opposite side of the transaction receipt when the second mode of operation for the transaction receipt printer is selected; and delivering to the transaction terminal user the transaction receipt.

8. The method of claim 7, wherein the transaction terminal comprises a self-service transaction terminal selected from one of a self-service checkout terminal, an automated teller machine (ATM), a financial statement kiosk, an airport check-in kiosk, a hotel check-in kiosk, and a car rental kiosk.

9. The method of claim 7, wherein the transaction terminal comprises a point-of-sale (POS) transaction terminal.

10. The method of claim 7, wherein the method is performed by a computer having a memory executing one or more programs of instructions which are tangibly embodied in a non-transitory program storage medium readable by the computer.

* * * * *